(12) United States Patent
Rhodes

(10) Patent No.: US 11,297,379 B2
(45) Date of Patent: Apr. 5, 2022

(54) PROGRAM SEQUENCER FOR MULTI-DISPLAY ENVIRONMENT

(71) Applicant: InterDigital Madison Patent Holdings, SAS

(72) Inventor: Robert Andrew Rhodes, Carmel, IN (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 15/534,052

(22) PCT Filed: Dec. 1, 2015

(86) PCT No.: PCT/US2015/063155
§ 371 (c)(1),
(2) Date: Jun. 8, 2017

(87) PCT Pub. No.: WO2016/099865
PCT Pub. Date: Jun. 23, 2016

(65) Prior Publication Data
US 2017/0366844 A1    Dec. 21, 2017

Related U.S. Application Data

(60) Provisional application No. 62/094,489, filed on Dec. 19, 2014.

(51) Int. Cl.
*H04N 21/234*    (2011.01)
*H04N 21/438*    (2011.01)
(Continued)

(52) U.S. Cl.
CPC ..... *H04N 21/4383* (2013.01); *H04N 21/4122* (2013.01); *H04N 21/436* (2013.01);
(Continued)

(58) Field of Classification Search
None
See application file for complete search history.

(56) References Cited

U.S. PATENT DOCUMENTS

| | | | |
|---|---|---|---|
| 5,537,153 A * | 7/1996 | Shigihara | H04N 5/44 348/723 |
| 2002/0073431 A1 * | 6/2002 | Nikolich | H04N 7/17309 725/111 |

(Continued)

FOREIGN PATENT DOCUMENTS

| | | |
|---|---|---|
| CN | 1758748 | 4/2006 |
| CN | 102783139 | 11/2012 |

(Continued)

OTHER PUBLICATIONS

ISR for PCT/US2015/063155 dated Apr. 11, 2016.
(Continued)

*Primary Examiner* — Nasser M Goodarzi
*Assistant Examiner* — Terrika Peterson
(74) *Attorney, Agent, or Firm* — Invention Mine LLC

(57) ABSTRACT

Programmable media interfaces, methods and systems for programming a plurality of displays in a multiple display environment are described herein. The media interfaces, methods and systems include processors configured to program a sequence of broadcast content to the plurality of display devices, control pre-set or pre-programmed sequencing of the broadcast of the future content at times, and select particular displays in the plurality of displays to display portions of the broadcast content at the pre-set or pre-programmed times for future playing.

20 Claims, 7 Drawing Sheets

(51) Int. Cl.
*H04N 21/436* (2011.01)
*H04N 21/458* (2011.01)
*H04N 21/472* (2011.01)
*H04N 21/482* (2011.01)
*H04N 21/41* (2011.01)

(52) U.S. Cl.
CPC ....... *H04N 21/458* (2013.01); *H04N 21/4583* (2013.01); *H04N 21/4586* (2013.01); *H04N 21/47214* (2013.01); *H04N 21/4821* (2013.01); *H04N 21/4825* (2013.01)

(56) References Cited

U.S. PATENT DOCUMENTS

| | | | |
|---|---|---|---|
| 2004/0117853 A1 | 6/2004 | Karaoguz et al. | |
| 2006/0026643 A1 | 2/2006 | Silverberg | |
| 2006/0037048 A1* | 2/2006 | DeYonker | H04N 5/44543 725/58 |
| 2006/0064721 A1* | 3/2006 | Del Val | H04N 5/44543 725/41 |
| 2007/0011702 A1* | 1/2007 | Vaysman | H04N 5/44543 725/45 |
| 2008/0216077 A1* | 9/2008 | Emani | G05B 19/41865 718/102 |
| 2011/0194840 A1 | 8/2011 | Alexander | |
| 2013/0330063 A1 | 12/2013 | Bonovich et al. | |
| 2014/0181867 A1 | 6/2014 | Strachota et al. | |
| 2014/0270712 A1* | 9/2014 | Bennett | H04N 21/4532 386/292 |
| 2014/0366071 A1 | 12/2014 | Rhoads et al. | |
| 2015/0052568 A1* | 2/2015 | Glennon | H04N 21/482 725/100 |

FOREIGN PATENT DOCUMENTS

| | | | |
|---|---|---|---|
| CN | 103843289 A | 6/2014 | |
| WO | WO-2011115473 A2 * | 9/2011 | ......... H04L 27/2601 |
| WO | WO-2013048728 A1 * | 4/2013 | ....... H04N 21/23406 |
| WO | 2014014982 A1 | 1/2014 | |

OTHER PUBLICATIONS

International Search Report and Written Opinion of the International Searching Authority for PCT/US2015/063155 dated Apr. 18, 2016, 10 pages.

International Preliminary Report on Patentability for PCT/US2015/063155 dated Jun. 20, 2017, 6 pages.

Anonymous, DirecTV COM1000 Intergrator's Manual Software Version ST02.08.07, XP055205927, Nov. 20, 2012. Retrieved from the Internet: http://www.technicolor.com/sites/default/files/medialib/document/bloc_download/sshp_ecommerce/com1000_integrators_manual_v2.72.pdf [retrieved on Aug. 3, 2015] (129 pages).

* cited by examiner

PROGRAM SEQUENCER FOR MULTI-DISPLAY ENVIRONMENT

This application claims the benefit, under 35 U.S.C. § 365 of International Application PCT/US2015/063155, filed 1 Dec. 2015, which was published in accordance with PCT Article 21(2) on 23 Jun. 2016 in English and which claims the benefit of U.S. provisional patent application No. 62/094,489, filed 19 Dec. 2014.

FIELD OF THE INVENTION

The present principles relate to quadrature amplitude modulated (QAM) signals and the use of QAM modulators which utilize program guides stored in remote controls for use in a multiple display environment wherein a manager of the environment can control the displays from the remote control. More specifically, the present principles relate to user interfaces which extend the control to include a pre-set or pre-programming interface that allows for a sequencing of future content playback.

BACKGROUND OF THE INVENTION

There are many environments where multiple video display devices, for example televisions (TV) exist, but only a few tuners/receivers are in place to send audio and video to the TVs. Sports bars are a prime example of such an environment, but many others such examples are extant, especially when it is desired to send different channels or subchannels to different places in an environment, but to save cost, only a limited number of receivers are provided.

In the sports bar environment, for example, bartenders want to be able to control the content on each TV without having to use single or multiple TV remotes, since using a TV remote may cause adjacent TVs to also change channels. Using a remote in a sports bar thus now requires walking to each TV with a specific remote to change the channel, which may cause other nearby TVs to undesirably also change channels.

One such receiver, although there are many such receivers, which is often placed in a multiple TV environment such as a sports bar, is the DirecTV® COM1000 content distribution system (designed and manufactured by TECHNICOLOR Inc., the owner of the present application, which is a satellite TV receiver system capable of tuning and transcrypting up to 24 TV channels and which tunes and demodulates an MPEG-2 transport stream for further distribution in an environment through, for example, a QAM modulator device or an internet protocol (IP) data distribution system, for example an IPTV system. The DirecTV® COM1000 is ideal for the multiple TV environment such as hotels, sports bars, and the like.

The DirecTV® COM1000 includes a QAM modulator card or board which receives the demodulated MPEG-2 transport stream for further distribution. The card is denoted a QAM24 modulator and it receives MPEG-2 transport packets from an Ethernet port and then QAM modulates the MPEG-2 transport packets on one of twelve carrier frequencies. Each input stream results in one output QAM modulated channel (such as cable channel 50-1). However, nothing in the current content distribution systems allows individual receivers to play separate content on each TV without controlling the content with a separate remote for each TV.

Moreover, currently there is no way in which a manager of such an environment, for example a Bartender in a sports bar, can search for video content and see what channels are currently playing and to allow the content to be changed, tracked and otherwise adjusted.

A television display system needs to display an interactive program guide with current and future program information for each channel. In order to acquire the information, the system must tune to the frequency on which the program information is being broadcast. This information may be stored for all known channels, but will not initially be available, and will become stale over time. For this reason, the channel must be tuned as the user navigates within the interactive guide.

Currently interfaces in such facilities (e.g., bars, restaurants, etc.) may be used to control the current viewed content on a plurality of displays. However, issues may arise in controlling or changing the programming, particularly at times when the facility is busy and workers are unable to attend to the changes. There is a need for a mechanism to allow a pre-set or pre-programming arrangement that may be established ahead of the viewing time for controlling the viewed content.

An improvement in multi-display content viewing control is available through the Mediatune™ interface offered in conjunction with the Colony multichannel distribution system, both also provided by Technicolor, the owner of the present application. However, the Mediatune™ interface only offers real-time control for routing programming from the tuner inputs to a plurality of displays.

Other scheduling mechanisms are based on recording future content. In this case, the mechanism only involves selecting a program to record. The destination for the content is at only one place; the recording device. It would be useful to provide a mechanism which can select not only the program, but also one or more of a plurality of display devices that the program will be displayed on.

SUMMARY OF THE INVENTION

The above-referred to problems are solved, and long felt needs met by programmable media interfaces, methods and systems for programming a plurality of displays in a multiple display environment in accordance with the present principles. The media interfaces, methods and systems comprise processors configured to program a sequence of broadcast content to the plurality of display devices, control pre-set or pre-programmed sequencing of the broadcast of the future content at times, and select particular displays in the plurality of displays to display portions of the broadcast content at the pre-set or pre-programmed times for future playing. Preferably, the Mediatune user interface is used and extends the control to include a pre-set or pre-programming interface that allows for a sequencing of future content playback.

The principles described and claimed herein will be best understood by reading the following detailed description in conjunction with the drawings which are first described briefly below.

BRIEF DESCRIPTION OF THE DRAWINGS

FIG. 4 illustrates a preferred sequencing interface utilizing principles described herein.

FIG. 5 illustrates a second preferred sequencing interface utilizing principles described herein.

DETAILED DESCRIPTION OF THE PREFERRED EMBODIMENTS

Figure 1:
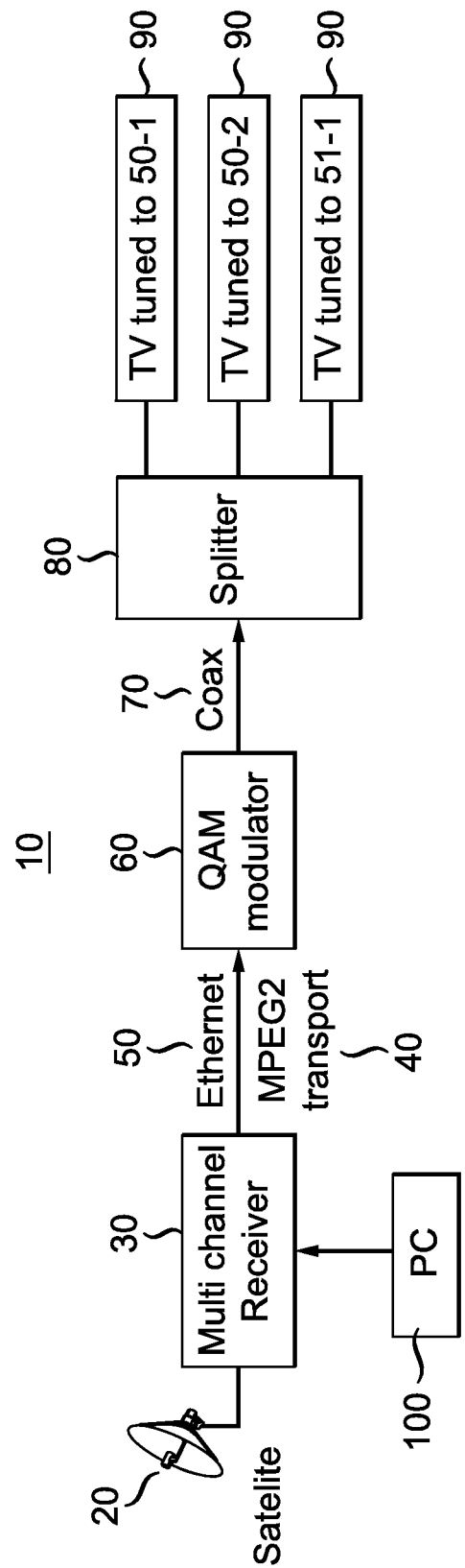
FIG. 1 is a block diagram of a preferred multi-channel distribution system for implementing principles described herein.

FIG. 1 shows an exemplary system based on the Colony system architecture.

Other similar systems may also be used. A satellite signal 20 provided by a service provider through a satellite dish is input to a multichannel receiver 30. The satellite signal 20 contains a plurality of program streams (e.g., audio, video, data) organized or grouped into sets of channels or transponders. Multichannel receiver 30 tunes and demodulates one or more channels or transponders in the satellite signal 20 and produces an MPEG-2 transport stream 40 having packets containing data, audio, and video programming to be distributed to the environment. In a preferred embodiment, COM 24 receiver 30 includes tuning and demodulation circuits to receive a multiplicity of channels or transponders simultaneously. It is important to note that other versions may be possible, including systems capable of receiving more or fewer channels or transponders.

The MPEG-2 transport stream 40 is preferably transported by an Ethernet link 50 to a quadrature amplitude modulation (QAM) modulator 60 which modulates the MPEG-2 transport stream 50 to produce one or more QAM channels. While preferred embodiments of the present principles utilize QAM modulators and MPEG-2 transport streams, it will be appreciated by those skilled in the art that other kinds of modulators are equally usable and many different types of transport protocols are also usable. Therefore, VSB modulators, QPSK modulators, OFDM modulators, and their equivalents are all covered by the current invention. Moreover, IP signaling transport streams, DVB transport streams, MPEG-4 transport streams, ARIB transport streams, and their equivalents are also covered by the disclosure.

Preferably, the QAM modulator 60 modulates the MPEG-2 transport stream 40 on one of a plurality of carrier frequencies. Each input stream 40 results in one or more output QAM modulated channels which are output over a coax cable 70 and split into more than one signal using splitter 80. The signals from splitter 80 are provided to TVs 90. In this fashion, the QAM modulator 60 permits dynamic duplication of output channels so that each TV 90 may be statically tuned to a fixed channel, for example, channels 50-1, 50-2, 50-3, etc., thereby eliminating the necessity for each channel to be individually tuned with a separate remote control device and allowing different programs to be played on different TV sets 90 without interference from other, nearby TV sets being tuned with a remote control to provide different desired programs. Optionally, a web browser 100 (as used on a tablet, PC, or smart phone) is provided and interfaced to the receiver 30 to control the data programming necessary to accomplish these results and to provide other functionality to perform the functions of content distribution system 10.

A content distribution system, such as described in FIG. 1, allows multiple channels to be played on multiple TV sets without the need to separately tune the TV sets using a remote control, which would potentially interfere with the channels being broadcast on nearby TV sets in an environment. A modulator dynamically duplicates the output of channels, thereby allowing multiple TV sets to be statically tuned to a fixed channel and potentially to different fixed channels. The modulator can then duplicate the output so that a single input MPEG-2 transport stream can be sent out on multiple channels and/or sub-channels to each of the TV sets.

Figure 2:
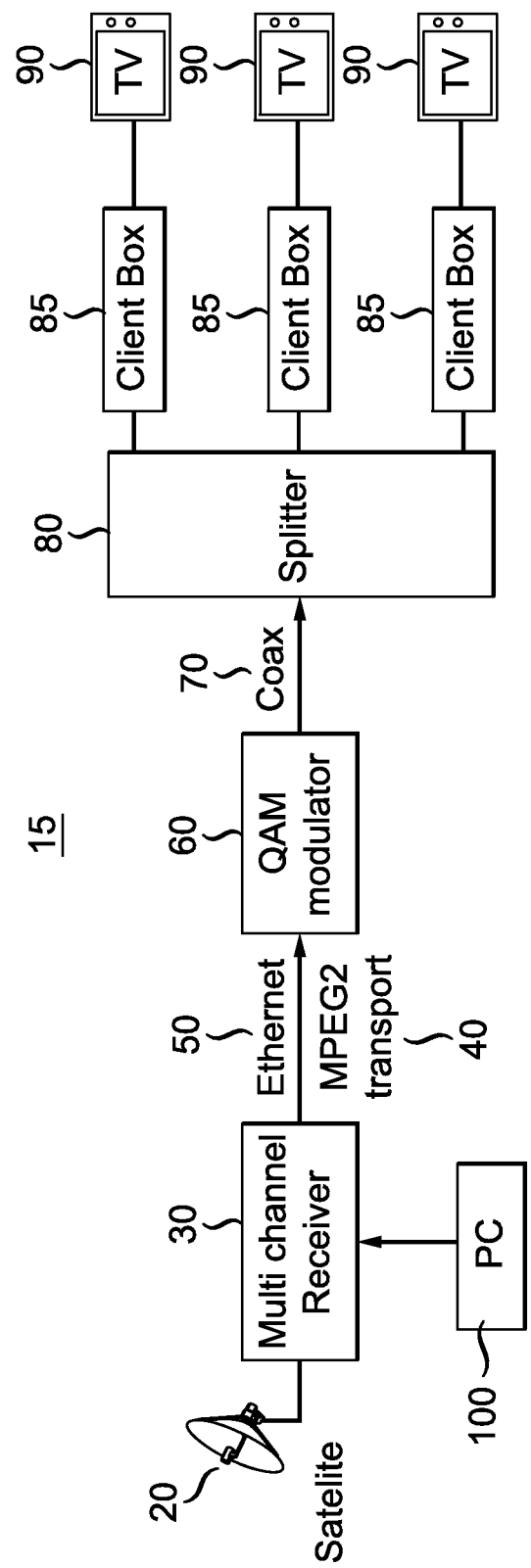
FIG. 2 is a block diagram of another preferred multi-channel distribution system for implementing principles described herein.

The system in FIG. 1 describes a multichannel distribution control system operating with the outputs for the modulators controlled to provide specific streams and with the TV devices remaining tuned to a fixed channel. However, additional operational flexibility may be possible if the television channel programming is also addressable. Turning to FIG. 2, another embodiment of a content distribution system according to principles of the disclosure is shown at 15. Content distribution system 15 illustrates a system for delivering content to a plurality of video display devices that also incorporates addressable QAM signal receiving equipment that may be present in the bar, casino, or multi-room facility. Content distribution system 15 includes elements identified by the same reference numbers as shown as shown in FIG. 1. Except as described below, these elements operate in a manner similar to same elements described in FIG. 1 and will not be further described here.

Client boxes 85 receive a signal (e.g., a QAM signal) distributed from QAM modulator 60 through splitter 80. Client boxes 85 may be set top or set back converter boxes that are often used with some (older) television sets that may not be capable of receiving QAM signals directly. Client boxes 85 include a QAM tuner input circuit, a signal conversion circuit, a user remote control circuit, a high definition multimedia interface (HDMI) output interface, an audio/video output interface, and a channel ¾ output interface. Client boxes 85 receive the input signal, convert the input signal to a signal format that is compatible with a television or other type of display device (e.g., TV 90), and provide the converted signal to TVs 90.

In addition, the client boxes 85 are addressable over the communication network through splitter 80. As a result, the channel that is tuned by each client box 85 may be controlled by signals sent from QAM modulator 60. Each client box 85 has a unique Receiver Identifier (RID) that is used for remote addressability.

Figure 3:
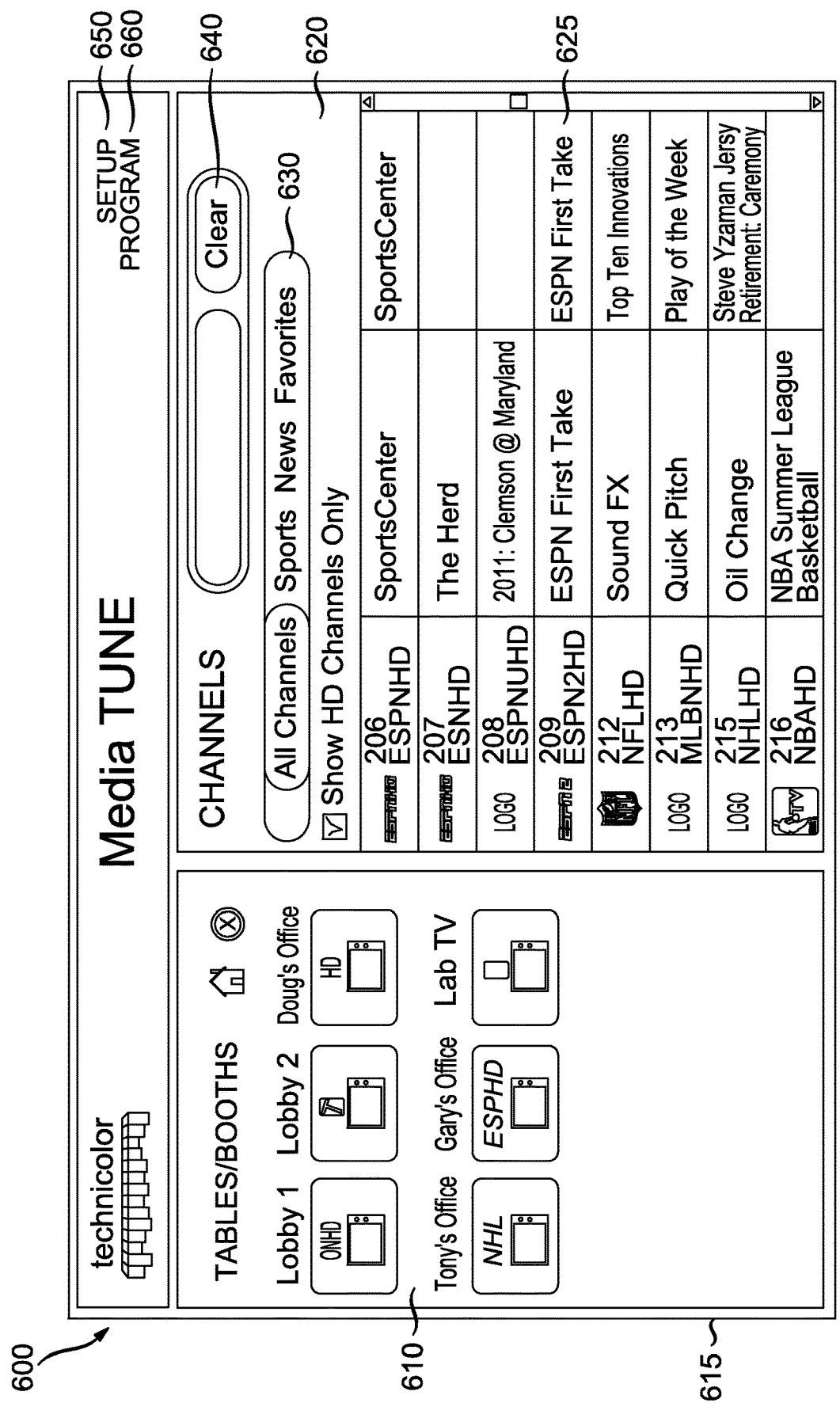
FIG. 3 illustrates a user interface for implementing principles described herein.

FIG. 3 shows an exemplary user interface 600 based on the Mediatune interface used with a Colony structure. User interface 600 permits operation in a visual drag and drop operating environment. User interface 600 shows televisions in use in display box 610 on the left and available channels in a display box 620 on the right. In display box, 610 the televisions in the system are shown as icons 615 with the icons including information associated with the currently displayed content. In display box 620, the available channels are shown as individual entry lines 625 with associated channel information in a scrollable list. Any available channel 625 in display box 620 may be selected and dragged to any one or more of the TV icons 615 shown in display box 610. Once the channel 625 is dragged, the TV icon 615 on the left is updated to show information for the content (e.g., the logo for the channel or program) now being displayed.

Additional features in user interface 600 include being able to duplicate a program between the different television icons 615 using a simple drag and drop operation. The left display box 610 may also include some form of a description for each of the television icon 615 (e.g., a number or a location for the television). The right display box 620 may also be "organized" using groupings or tabs 630. Examples of groupings or tabs 630 include, but are not limited to "sports", "news", and "favorites". Display box 620 may also include a search function 640. The search function 640 may allow direct text entry search for channel identifiers, program titles, or other information. The result of the search may result in a highlighted channel entry 625 in the list. User interface 600 may also include a setup icon 650 used for initial configuration or updates to the configuration (e.g., arrangement or identification of television icons).

The user interface shown in FIG. 3 also includes a PROGRAM button 660. This PROGRAM button 660 will allow a programming or sequencing of future programming and display changes to improve the operation of the Mediatune interface. As an example of the need for the sequencing, suppose that on a particular day at the facility, the owner recognizes that a portion of the facility will want to watch a first football game involving the Colts on a first channel and another portion of the facility will want to watch the Packers on a second channel. Both games are on at 3 PM and are expected to run until 6 PM. At 6 PM it would be best to switch all TVs to a sports wrap up show that will be shown on a third channel. The owner would like to sequence the programming so that one set of the displays switch to showing the Colts game at 3 PM, another set of the displays switch to showing the Packers game at 3 PM and all of the displays switch to the wrap up show at 6 PM.

In order to do this, the owner must have a control point that includes a list of future programs available and a way to schedule the channel and program changes for each of the displays based on displaying one or more of these future programs. The present principles preferably utilize the Mediatune user interface and extends the control to include a pre-set or pre-programming interface that allows for a sequencing of future content playback.

Figure 4:
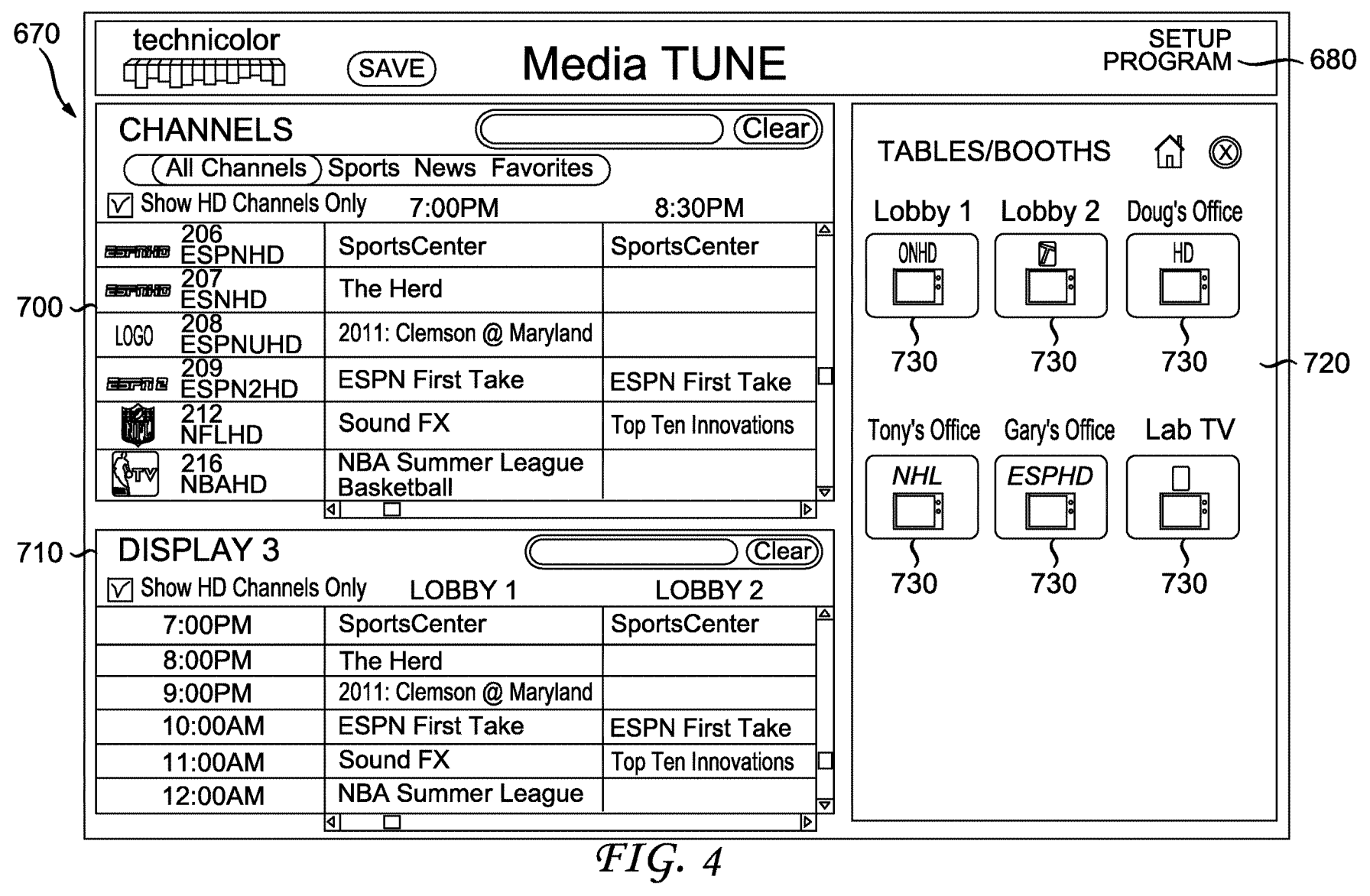

FIG. 4 shows a first view of the sequencing interface 670 in conjunction with Mediatune. The sequencing view may be intentionally different from the "current" operation view of the user interface. The view may be entered by selecting the PROGRAM button 680. The left half 690 includes two "guides" 700, 710. The upper guide 700 is the available channel guide, scrollable both vertically and horizontally. This guide is intended to show all the programs available including in the future (in some cases up to one week in advance). The guide may be filtered for different types of programming.

The lower portion 710 shows a similar guide but in a format based on the plurality of display devices, and the content that will be shown based on the programming sequence. This guide is maintained and updated based on the programming entries performed. The right side 720 shows the display devices 730 (similar to the previous left side 690). Note that this view may be tiled set of displays, or may a visual representation of the facility in some manner.

In operation, a user drags and drops a program from the channel guide, either to the display column in the display guide, or to the display device shown on the right side. The entry is then added to the sequence. Note that the time aspect remains the same—a program is shown at its date and time on a display based on when it is available per the channel guide. It is recognized that this may lead to conflicts between programming times and with the number or tuning resources versus the displays. This conflict may be resolved in the manner described below. Also note that if a program is dropped on a tile on the right side 720, the display guide 710 on the lower left is automatically updated. Also, clicking the tile on the right may highlight the column in the display guide or may open a pop up window next to the tile to reveal the programming schedule for this display.

Figure 5:
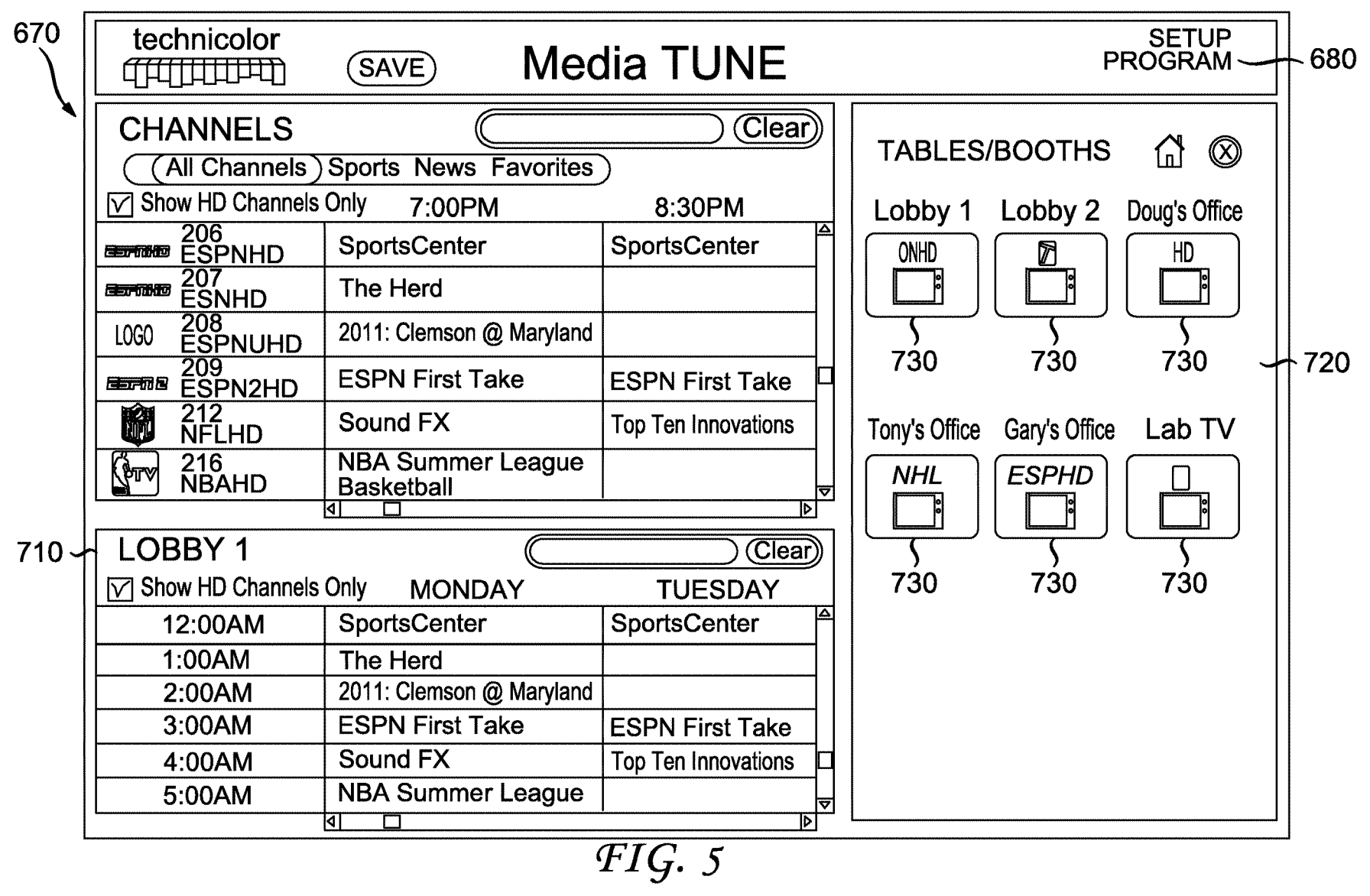

FIG. 5 shows a second view of the sequencing interface 670 in conjunction with Mediatune™. The second view only changes the lower left display 710 to show a single display and the programming on a grid showing a time of day and each day of the week. In this manner, a user can review the program plan for a single display for an entire week. Entering this second view may be done by double tapping the display element on the right side or double tapping the column for the display in the first view described above. A second double tap or other mechanism may return the interface to the first display. It is important to note that a mechanism, such as a double tap, on a program entry in any of the grids may open a window that shows additional information about the program.

Figure 6:
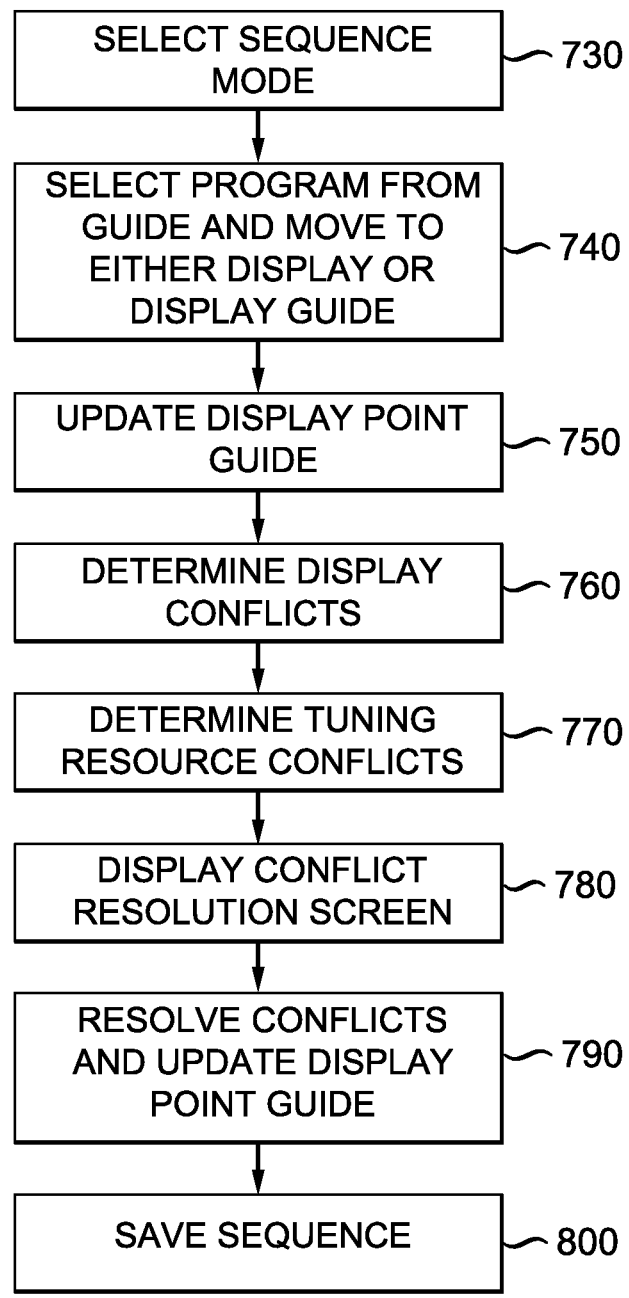
FIG. 6 is a flow chart of a method of implementing principles described herein.

FIG. 6 shows a flow chart for implementing the sequencer. As described earlier, the content distribution system may not include enough tuning resources to provide all requested programs when developing the sequence. As a result, it may be possible that a request for a new channel to be tuned cannot be adequately fulfilled because all of the tuning resources are already being used for other channels. Additionally, the user may request a program change on a particular television without being aware that the current program is also being displayed on other televisions. It is desirable to determine such problems and to present the user (e.g., facility manager or owner) with the possible changes to the televisions and what they are tuned to and the impact (on the patrons of the facility). In this case, an additional user interface screen is displayed, presenting the user with a set of options for fulfilling the channel change request.

At step 730, a sequence mode is selected and at step 740, a program is selected from the guide and moved to either a display or the display grid. At step 750, the display point guide is then updated. The display conflicts are then determined at step and 760 and at step 770, tuning resource conflicts are then determined. These conflicts are then displayed at step 780, and at step 790 the conflicts are resolved and the display point guide is updated. The sequence is saved at step 800. If will be appreciated by those with skill in the art that the flow chart of FIG. 6 will be implemented in software, firmware or in any appropriate digital signal processor, programmable array logic, or the like, depending on the design of the system and the system's resources.

Figure 7:
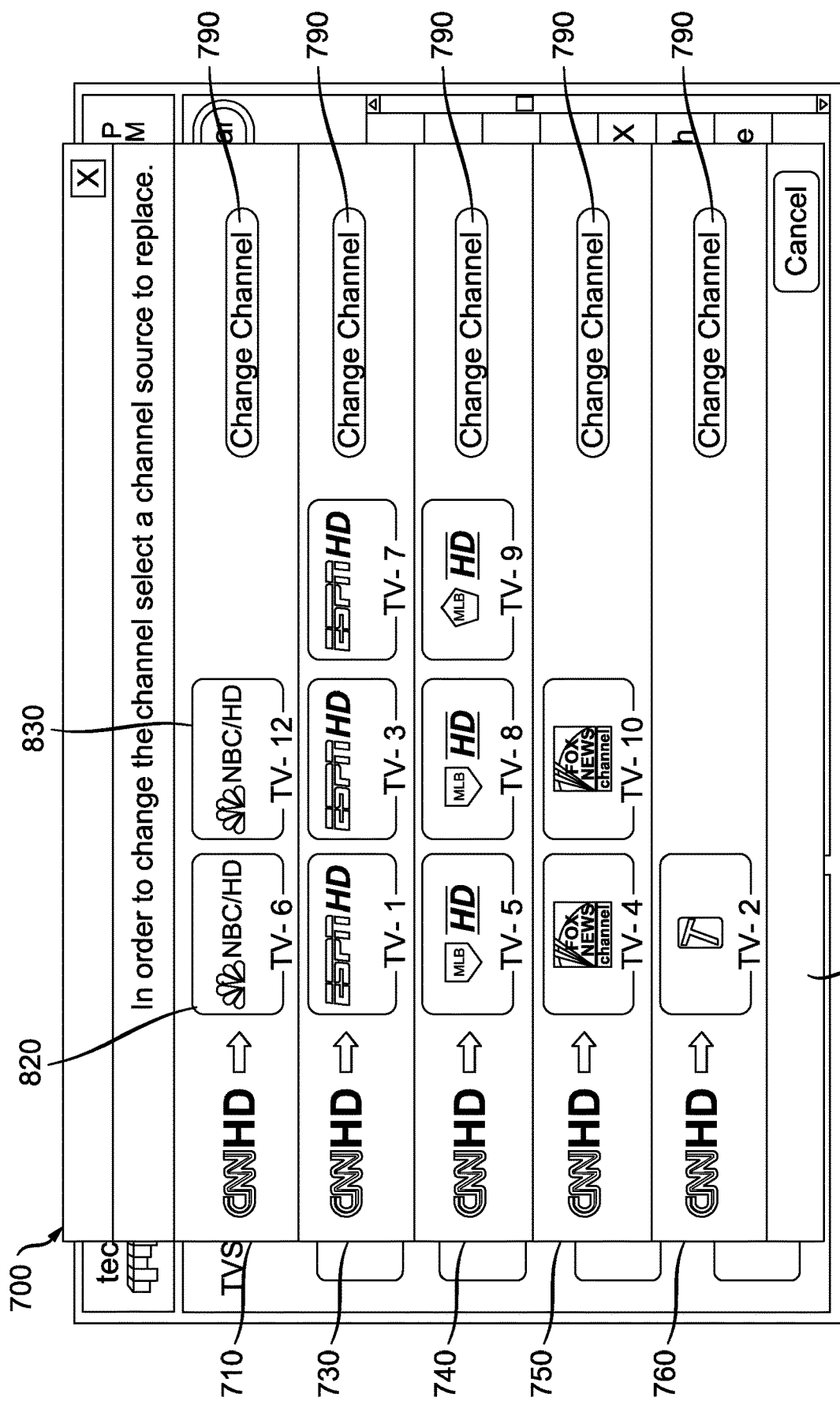
FIG. 7 illustrates a user interface overlay to implement conflict resolution in accordance with principles described herein.

FIG. 7 shows an exemplary approach, as a user interface overlay 810, to tuning conflict resolution, similar to that used for the problem when it occurs with a current display and programming arrangement as set forth with regard to FIG. 6 above. In this conflict resolution mode, additional selections (not shown) could be included. For example, options may be included to allow a "cut early" to next program before the current one is over, or a "cut in" to next program once the current one is over. The option may also be given to simple pick another display, or even to cancel the current attempt at entry.

Once the sequencing is entered operation of the system progresses based on the sequencing program. The system may use a clock that is based on the system time base or the satellite time base and include a corrected offset for local time as the channel changes are implemented when the channel sources are selected 820. Any programming 830 may be manually changed as a current entry change during the normal Mediatune user interface operation. Finally, repetitive program sequencing may be possible based on learning the programming habits of the user.

The interface may monitor programming activity over a period of time and extract viewing habits of the operator's establishment to provide a "quick view" programming option. For example if the interface detects that programming consistently revolves around Colts and Packers games, the operator could be offered a guide as described above with pre-indicated entries, say the Colts and Packers games prepopulated in the programming selection grid. The interface could further detect that another program or network is consistently the least chosen and offer a pre-chosen tuning conflict resolution. There are many variations to this theme. The interface could detect the type of establishment the system is likely installed in (sports books, casual dining, bar and grill, etc.) based on historical programming selections and offer a series of preselected programming options. Based on responses to pre-selection options, the interface could further refine or reorder offerings. Eventually the interface should be able to allow nearly one button tuning for a week's or month's worth of programming at a time. Based on what it has learned it should also be able to make effective offerings of special events or seasonal programming.

What is claimed:

1. A method of programming a plurality of displays in a multiple display environment comprising:
   receiving a plurality of program streams which have been organized into a set of channels;
   demodulating the program streams to condition the program streams for output of individual programs to the plurality of channels;
   transporting the demodulated stream of channels to a modulator to produce a plurality of modulated output channels that are transportable to the plurality of displays in the multiple display environment;
   programming a sequence of broadcast content corresponding to the modulated output channels for output to the plurality of display devices;
   controlling pre-set or pre-programmed sequencing of the broadcast content corresponding to the modulated output channels for output to the plurality of displays at future times;
   selecting particular displays in the plurality of displays to display portions of the broadcast content corresponding to the modulated output channels at the future times for future playing;
   determining a display conflict with the particular displays selected;
   determining a tuning resource conflict separately from the display conflict;
   resolving the display conflict with the particular displays selected; and
   resolving the tuning resource conflict.

2. The method recited in claim 1, further comprising outputting for display a point guide containing information about the broadcast content.

3. The method recited in claim 2, further comprising determining the display conflict within a display point guide after the display point guide has been updated.

4. The method recited in claim 3, further comprising determining tuning resources in accordance with the display conflict.

5. The method recited in claim 4, further comprising outputting for display a conflict resolution screen on a remote control.

6. The method recited in claim 5, further comprising updating the display point guide after resolving the display conflict.

7. The method recited in claim 6, further comprising saving the display point guide with a resolved sequence of information about the broadcast content.

8. The method recited in claim 7 wherein the remote control consists essentially of one of a tablet, PC or smart phone.

9. The method of claim 1, further comprising:
   receiving a programming or channel change request;
   updating a display point guide;
   displaying the tuning resource conflict and the display conflict; and
   further updating the display point guide.

10. An apparatus configured to manage an environment containing a plurality of displays, comprising:
    a receiver configured to:
      receive a plurality of program streams which have been organized into a plurality of channels; and
      demodulate the plurality of program streams to produce a plurality of demodulated streams corresponding to the channels;
    a modulator configured to modulate the plurality of demodulated streams corresponding to the channels for output on a plurality of frequencies to produce a modulated output signal;
    a splitter configured to:
      communicate with the modulator; and
      split the modulated output signal thereby producing one or more output modulated channels that carry broadcast content;
    a processor for programming the plurality of displays in the environment configured to:
      program a sequence of the modulated channels to the plurality of display devices;
      control pre-set or pre-programmed sequencing of the modulated channels for output to the plurality of displays at future times;
      select particular displays in the plurality of displays to display particular of the modulated channels for future playing;
      determine a display conflict with the particular displays selected;
      determine a tuning resource conflict separately from the display conflict;
      resolve the display conflict with the particular displays selected; and
      resolve the tuning resource conflict.

11. The apparatus recited in claim 10, wherein the processor is further configured to output for display a point guide containing information about the broadcast content.

12. The apparatus recited in claim 11, wherein the processor is further configured to determine the display conflict within a display point guide after the display point guide has been updated.

13. The apparatus recited in claim 12, wherein the processor is further configured to determine tuning resources in accordance with the display conflict.

14. The apparatus recited in claim 13, wherein the processor is further configured to output for display a conflict resolution screen on a remote control.

15. A method of programming a plurality of displays in a multiple display environment comprising:
    receiving a plurality of program streams which have been organized into a set of channels;

demodulating the program streams to condition the program streams for output of individual programs to the plurality of channels;

transporting the demodulated stream of channels to a modulator to produce a plurality of modulated output channels that are transportable to the plurality of displays in the multiple display environment;

programming a sequence of broadcast content corresponding to the modulated output channels for output to the plurality of display devices;

controlling pre-set or pre-programmed sequencing of the broadcast content corresponding to the modulated output channels for output to the plurality of displays at future times;

selecting particular displays in the plurality of displays to display portions of the broadcast content corresponding to the modulated output channels at the future times for future playing;

outputting for display a display point guide containing information about the broadcast content;

updating the display point guide;

determining a display conflict within the display point guide after the display point guide has been updated; and determining a tuning resource conflict separately from the display conflict;

resolving the display conflict within the display point guide;

resolving the tuning resource conflict; and displaying resolution performed to resolve the display conflict.

16. The method of claim 15,
wherein the display point guide comprises a display guide, and
wherein the method further comprises displaying one or more options to resolve the display conflict.

17. The method of claim 15, wherein controlling pre-set or pre-programmed sequencing of the broadcast content comprises selecting a sequence mode.

18. The method of claim 15, wherein resolving the display conflict comprises:
displaying one or more options to resolve the display conflict;
receiving an indication of a resolution option selected from the one or more options to resolve the display conflict; and
updating one or more of the particular displays selected in accordance with the resolution option selected.

19. The method of claim 18, wherein the one or more options comprise at least one of a cut early to a next program before a current program finishes or a cut in to the next program once the current program finishes.

20. The method of claim 15, wherein resolving the display conflict comprises performing a default resolution based on previous activity.

* * * * *